(12) United States Patent
Holliday (10) Patent No.: US 8,800,302 B2
(45) Date of Patent: Aug. 12, 2014

(54) DRIVING AN ACTIVE VIBRATION BALANCER TO MINIMIZE VIBRATIONS AT THE FUNDAMENTAL AND HARMONIC FREQUENCIES

(75) Inventor: Ezekiel S. Holliday, Belpre, OH (US)

(73) Assignee: Sunpower, Inc., Athens, OH (US)

( * ) Notice: Subject to any disclaimer, the term of this patent is extended or adjusted under 35 U.S.C. 154(b) by 178 days.

(21) Appl. No.: 13/549,712

(22) Filed: Jul. 16, 2012

(65) Prior Publication Data

US 2014/0013842 A1    Jan. 16, 2014

(51) Int. Cl.
*F25B 9/00*    (2006.01)

(52) U.S. Cl.
USPC .............................................................. 62/6

(58) Field of Classification Search
None
See application file for complete search history.

(56) References Cited

U.S. PATENT DOCUMENTS

| | | | |
|---|---|---|---|
| 3,509,971 A * | 5/1970 | Gerstine et al. ............... | 188/382 |
| 4,339,960 A | 7/1982 | Senft | |
| 4,490,841 A | 12/1984 | Chaplin et al. | |
| 5,313,399 A * | 5/1994 | Beale ............................. | 701/124 |
| 5,392,607 A * | 2/1995 | Wu ................................. | 62/6 |
| 5,412,951 A * | 5/1995 | Wu ................................. | 62/6 |
| 5,836,165 A * | 11/1998 | Champion et al. .................. | 62/6 |
| 6,510,715 B1 * | 1/2003 | Simsek ......................... | 68/12.06 |
| 7,511,459 B2 | 3/2009 | Holliday | |
| 2001/0053951 A1 | 12/2001 | Goto et al. | |
| 2004/0119434 A1 | 6/2004 | Dadd | |
| 2005/0184214 A1 | 8/2005 | Mizushima et al. | |

FOREIGN PATENT DOCUMENTS

| | | |
|---|---|---|
| GB | 2255256 A | 10/1992 |
| WO | 2007147994 A1 | 12/2007 |

* cited by examiner

*Primary Examiner* — Andre Allen
(74) *Attorney, Agent, or Firm* — Frank H. Foster; Kremblas & Foster (57) ABSTRACT

Vibrations of a principal machine are reduced at the fundamental and harmonic frequencies by driving the drive motor of an active balancer with balancing signals at the fundamental and selected harmonics. Vibrations are sensed to provide a signal representing the mechanical vibrations. A balancing signal generator for the fundamental and for each selected harmonic processes the sensed vibration signal with adaptive filter algorithms of adaptive filters for each frequency to generate a balancing signal for each frequency. Reference inputs for each frequency are applied to the adaptive filter algorithms of each balancing signal generator at the frequency assigned to the generator. The harmonic balancing signals for all of the frequencies are summed and applied to drive the drive motor. The harmonic balancing signals drive the drive motor with a drive voltage component in opposition to the vibration at each frequency.

7 Claims, 5 Drawing Sheets

DRIVING AN ACTIVE VIBRATION BALANCER TO MINIMIZE VIBRATIONS AT THE FUNDAMENTAL AND HARMONIC FREQUENCIES

STATEMENT REGARDING FEDERALLY-SPONSORED RESEARCH AND DEVELOPMENT

This invention was made with Government support under contract Task Order 5 NNC09TA29T awarded by NASA. The Government has certain rights in the invention.

CROSS-REFERENCES TO RELATED APPLICATIONS (Not Applicable)

REFERENCE TO AN APPENDIX (Not Applicable)

BACKGROUND OF THE INVENTION

This invention relates generally to the reduction or elimination of the mechanical vibrations of a principal machine by a method for driving an active balancer that is coupled to the principal machine so that the active balancer generates balancing forces in opposition to the forces generated by the principal machine. More particularly the invention relates to the reduction or elimination of mechanical vibration at not only the fundamental operating frequency of the principal machine but also at harmonics of that fundamental frequency.

Many machines vibrate as a consequence of the repetitive acceleration and deceleration of one or more periodically moving masses that are a part of the machine. In some environments the vibrations can be uncomfortable, distracting or annoying and in some they can interfere with the operation of other equipment and can even result in damage. One manner of reducing vibration is to mount the vibrating machine to another mass through an intermediate vibration damper, which may be a device or material that absorbs some of the energy of the vibration. However, because that way can only partially reduce the vibrations, a more effective way to eliminate, or at least minimize, the amplitude of the vibrations is to rigidly mount a vibration balancer to the vibrating machine. A vibration balancer generates forces that oppose the vibration; that is, it generates forces that are equal or nearly equal in amplitude but opposite in phase to, and thereby cancel or nearly cancel, the forces produced by the vibration.

Vibration balancers are generally of two types, passive vibration balancers and active vibration balancers, some of which are also known as tuned mass dampers, active mass dampers or vibration absorbers. A passive vibration balancer is essentially a resonant spring and mass system that is tuned to the operating frequency of the vibrating machine but is arranged to apply the forces from its accelerating and decelerating mass to the vibrating machine at a phase that is 180° out of phase with the forces resulting from the vibration. An active vibration balancer is essentially a mass, and may also be linked to a spring, but the motion of the mass is controlled by a control system that senses the vibrations and drives the mass in opposition to the vibrations.

Although a passive balancer is less expensive, it has the disadvantage that it can only respond to vibrations at the one resonant frequency to which it is tuned. An active balancer can respond to small variations in the frequency of the vibrations and can apply a compensating force at an amplitude that better cancels the vibration but an active balancer is more expensive and requires a controller to drive the active balancer at the required amplitude and phase. As far as known to me, neither a passive nor an active balancer has balanced vibrations at harmonics of the fundamental operating frequency of a vibrating machine.

Therefore, it is an object and feature of the invention to provide a method and apparatus for diminishing or eliminating the vibrations of a machine at both the fundamental operating frequency of the machine and at harmonics of that fundamental.

BRIEF SUMMARY OF THE INVENTION

The invention is a method for balancing the vibration of a principal vibrating machine at the fundamental operating frequency of the principal vibrating machine and selected harmonics of that operating frequency. The vibration of the principal vibrating machine is sensed to provide a sensed vibration signal representing the sensed mechanical vibration of the principal vibrating machine. A balancing signal is generated for at least the fundamental and a selected harmonic of the operating frequency and preferably a harmonic balancing signal is generated for each of several selected harmonics. The balancing signals are each generated by processing the sensed vibration signal with an adaptive filter algorithm of an adaptive filter. The adaptive filter algorithm for each selected frequency has quadrature, sinusoidally varying, reference inputs at its assigned selected frequency. The harmonic balancing signals for all of the selected frequencies are summed and applied to drive the drive motor of the active balancer. Each harmonic balancing signal at each selected frequency thereby drives the drive motor with a drive voltage component for each selected frequency that is in opposition to the vibration at each selected frequency.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

U.S. Pat. No. 7,511,459 is incorporated in this application by reference. This prior art patent shows an example of a control system for controlling a linear motor/alternator that is drivingly linked to a Stirling machine and which can be used with embodiments of the invention. More specifically, this patent discloses an example of what is referred to herein as a principal control system for applying a principal electrical drive voltage and current to its motor/alternator armature winding in order to control its operation at its operating frequency.

Although the originally contemplated application of the present invention is to balance the vibrations of a Stirling machine drivingly linked to a linear motor/alternator, the invention is also applicable to reducing the vibrations of other principal vibrating machines. The present invention can operate independently of the control system of the principal vibrating machine and therefore is not necessarily dependent upon that control system. However, interactions between the present invention and the control system of the principal vibrating machine can be added to the invention and one illustrated embodiment of the invention (FIG. 3) makes use of a signal from the control system of the principal vibrating machine.

Terminology and Prior Art Fundamental Principles

Stirling machines are often drivingly linked to a linear motor or a linear alternator. A Stirling engine can be a prime mover connected to a linear alternator to generate electric power. A Stirling machine operated in a heat pumping mode can be connected to and driven by a linear electric motor and pumps heat energy from one of its heat exchangers to another of its heat exchangers. A Stirling machine that pumps heat is sometimes referred to as a cooler when its purpose is to cool a mass and is sometimes referred to as a heat pump when its purpose is to heat a mass. The Stirling heat pump and the Stirling cooler are fundamentally the same machine to which different terminology is applied. Both transfer heat energy from one mass to another. Consequently, the terms cooler/heat pump, cooler and heat pump can be used equivalently when applied to fundamental machines. Because a Stirling machine can be either an engine (prime mover) or a cooler/heat pump, the term Stirling "machine" is used generically to include both Stirling engines and Stirling coolers/heat pumps. They are basically the same power transducers capable of transducing power in either direction between two types of power, mechanical and thermal.

Similarly, both an electric linear motor and an electric linear alternator are the same basic device. They have a stator, ordinarily having an armature winding, and a reciprocating member that includes one or more magnets, usually permanent magnets. A linear motor/alternator can be mechanically driven in reciprocation by a prime mover to operate as an alternator to generate electrical power or can be driven by a source of alternating electrical power to operate as a motor providing a mechanical reciprocating output. Consequently, the term linear motor/alternator can be used to refer to this basic electro-mechanical device.

Because of the above-described operational duality, a Stirling machine operating as an engine can be used to drive a linear alternator and a linear motor can be used to drive a Stirling machine operating in a heat pumping mode. In both cases, the power piston of the Stirling machine is ordinarily directly connected to the reciprocating member of the linear motor or alternator so that they reciprocate as a unit. Additionally, linear electric motors and Stirling engines can be used to drive other loads, such as the piston of a compressor for compressing a gas, for example in a refrigerator, or for pumping a fluid.

This description of the invention refers to a drive motor for an active balancer. Active balancers driven by a drive motor are well known in the prior art. A linear motor is particularly well suited for use with active balancers that are used with the present invention but the invention can be adapted to other motors that drive active balancers.

Prior Art Used with Embodiments of the Invention

All of the embodiments of the invention are used with a principal vibrating machine for which the invention minimizes the vibration. The principal vibrating machine typically has a control system that controls the motion of the principal vibrating machine. Embodiments of the invention are described and illustrated in association with a principal control system for the principal vibrating machine. However, the invention is not limited to the illustrated vibrating machines or their control systems. The only necessary connections between the invention and the principal vibrating machine and its control system is that the active balancer must be mechanically connected to the principal vibrating machine in order to apply counterbalancing forces to it and the invention uses a vibration sensor that is also mechanically connected to the principal vibrating machine in order to sense its vibrations. Because the active balancer is mechanically connected to the principal vibrating machine, the sensor may be connected to the active balancer to sense vibration.

Figure 1:
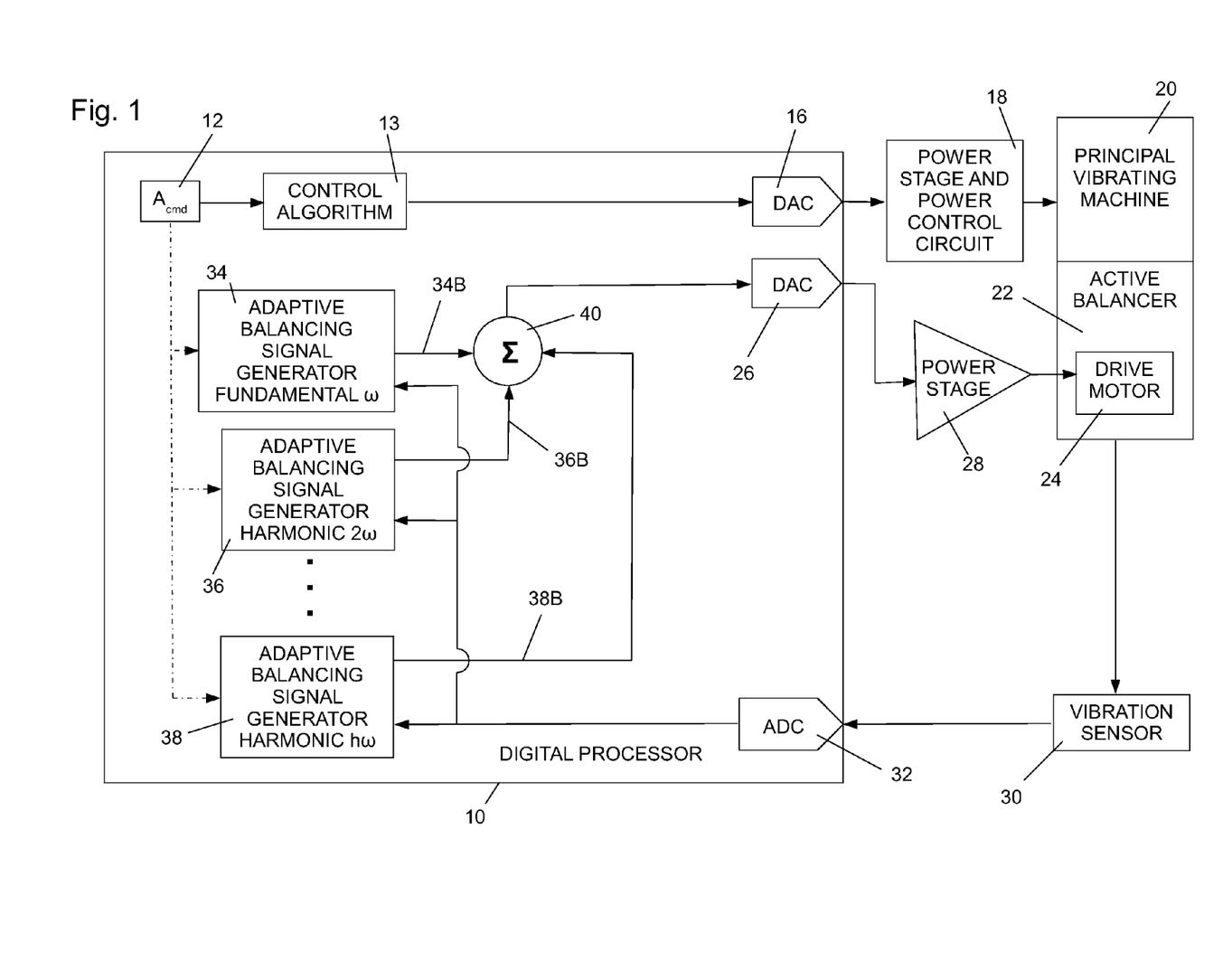
FIG. 1 is a block diagram illustrating the basic operation of the invention.

FIGS. 1, 3, 4 and 5 all include a prior art principal control system. FIG. 1 illustrates the basic principles of the invention. Modern prior art control systems utilize a digital processor such as a microprocessor, microcontroller or digital signal processor (DSP). As known to those skilled in the art, digital control circuit operation is commonly described in terms of mathematical operations performed on signals by control algorithms that are executed by the digital processor. A "signal" includes the representation of an analog signal in digital data format. Operations are often described in terms of historical predecessor analog devices, such as filters and signal generators, that performed such operations, even though those operations in modern circuits are performed instead by digital processors programmed to execute algorithms.

Referring to FIG. 1, a prior art principal control system is illustrated along a path across the top of the digital processor 10. As in the prior art, a principal control signal is generated by the principal control system at an operating frequency of reciprocation and is applied to a power stage that controls the principal vibrating machine by applying an alternating, principal electrical drive voltage to the armature winding of prime mover or motor or an alternator coupled to a Stirling engine. As common to most control systems, there is a command input 12 that is applied to a control algorithm. Command input 12 [$A_{cmd}$] represents a desired value for a parameter of operation of the principal vibrating machine at a fundamental driving frequency. The command input $A_{cmd}$ often represents an amplitude such as a stroke distance (e.g. in millimeters) or an armature coil voltage for driving a motor/alternator. The output from the principal control system controls the reciprocation of the principal vibrating machine, such as a coupled pair, at its fundamental operating frequency.

In FIG. 1, the prior art control algorithm is illustrated as a control algorithm 13. The result of the operation of the control algorithm 13 is applied through a digital to analog converter 16 to a power stage 18 that converts the control signal to the high power required to drive the principal vibrating machine 20. The power stage may include additional control circuitry.

As an example, the output of the power stage 18 may be applied to the armature winding of a motor/alternator in the principal machine. The motor/alternator is drivingly connected to a Stirling machine by a mechanical link to form a coupled pair, the two components of which are mounted to a common mechanical support. In practice, the casing for the alternator and the casing for the Stirling machine are formed integrally or are directly connected together.

The Invention

The method of the invention minimizes vibration of a principal vibrating machine at the fundamental operating frequency of that machine and at selected harmonics of the operating frequency. The basic concept is to sense and feed back the currently sensed amplitude and phase of the vibrations at those frequencies. The sensing of vibrations is essentially error detection because any vibration is error that is sought to be eliminated or at least minimized. A sinusoidally varying signal is generated at the fundament operating frequency and at each selected harmonic frequency. The amplitude and phase of each generated sinusoidally varying signal are periodically varied, updated and adapted to generate and maintain a balancing signal for each frequency. The balancing signals for each frequency are summed and together are continuously fed to drive the drive motor that drives the active balancer. The variation of each balancing signal for each frequency by periodic updating adapts the balancing signals to currently sensed vibrations, so that the sinusoidal balancing signal for each frequency is continuously applied to the drive motor to generate a compensating force at the appropriate phase, amplitude and frequency to bring the sensed vibrations at each frequency to a minimum. This is somewhat different from a standard closed loop, negative feedback control system which requires an error to drive the output. Here the error (the vibration) is driven to zero but once it is driven to zero, an adaptive algorithm maintains the same compensating output except when it senses increased or decreased vibration in which case it modifies the compensating output to again bring the vibration (error) to zero or to a minimum value.

Referring again to FIG. 1, a vibration sensor 30 is mounted in mechanical connection to the coupled principal vibrating machine 20 and active balancer 22, for example by being mounted to a casing or support on which the coupled pair is mounted. The vibration sensor 30 may be an accelerometer and senses the vibration of the coupled pair to provide a sensed vibration signal representing the sensed vibration.

The sensed vibration signal from the vibration sensor 30 is applied through an analog to digital converter 32 for processing by the digital processor 10. The sensed vibration signal in digital format is applied to each of a plurality of adaptive balancing signal generators, illustrated as 34, 36 and 38, each of which is an algorithm that generates a balancing signal for a different frequency. So, there is an adaptive balancing signal generator for the fundamental frequency and for each selected harmonic. Each adaptive balancing signal generator is assigned to and responds to one frequency. Although the invention can be practiced for balancing vibrations at a single frequency, or the fundamental and a single harmonic, preferably there are a plurality of such balancing signal generators for balancing a plurality of different harmonics. Although three balancing signal generators are illustrated for the fundamental frequency $\omega$ and two harmonics $2\omega$ and $h\omega$, where $\omega$ is the fundamental operating frequency and h is the $h^{th}$ harmonic, there can be as many balancing signal generators for as many harmonics and for whichever harmonics are selected by the designer.

As described in more detail below, the harmonic balancing signal for each selected frequency is generated by processing the sensed vibration signal with an adaptive filter algorithm of an adaptive filter. Reference inputs at each selected frequency are applied to the adaptive filter algorithm. Consequently, each of the balancing signal generators 34, 36 and 38 have an output 34B, 36B and 38B that is a balancing signal for balancing vibrations at its assigned frequency.

All of the balancing signals at outputs 34B, 36B and 38B are summed and the sum is used to control the drive motor 24. The sum is a resultant that has Fourier components at the operating fundamental frequency and at the selected harmonic frequencies. Consequently, the resultant sum drives the drive motor 24 so that its motion has those Fourier components. Each component at each frequency has an amplitude and phase to oppose the forces generated by the vibration of the principal vibrating machine 20 at the frequency of the component. In FIG. 1 the balancing signal for each selected frequency is shown summed at summing junction 40 and the sum is applied through a digital to analog converter 26 to a power stage 28 and then to the active balancer drive motor 24. Therefore, the sum of the balancing signals is a fed forward signal that controls the electrical drive voltage for the drive motor 24 thereby driving the motor 24 with a drive voltage component for each selected frequency in opposition to the vibration at each selected frequency. So each balancing signal generator provides an output signal to the summing junction 40 at a frequency, amplitude and phase which drives the drive motor 24 at a frequency, amplitude and phase to cancel the vibration at its assigned frequency to the extent practical.

Adaptive Filters

The harmonic balancing signals at outputs 34B, 36B and 38B are generated in part by use of adaptive filters. Adaptive filter techniques have been known in the prior art for decades. The adaptive filter algorithm that is preferred for use with the present invention is the Least Mean Squares (LMS) filter algorithm that was invented a half century ago. The art has developed various modified LMS algorithms as well as other adaptive filter algorithms which can be used with the present invention. These algorithms include SLMS a slight modification of the LMS algorithm, NLMS the normalized least mean squares filter and RLS the recursive least squares algorithm. The LMS algorithm is preferred because of its relative simplicity and suitability for use with the present invention. The LMS algorithm mimics a desired filter by finding the filter coefficients that relate to producing the least mean squares of an error signal. The error signal is the difference between a desired signal and the actual signal. In the present invention the error signal is the sensed vibration because the desired signal is no vibration.

An adaptive filter is basically a variable filter that is varied by its adaptive algorithm in response to a sensed error. The adaptive filter is adapted based upon the currently sensed error. The error signal is processed by the algorithm which then modifies or updates the variable filter. In the present invention the variable filter is a simple gain; that is, a multiplier (amplifier) the value of which is controllably varied by the algorithm in response to sensed error. The value of the variable filter is modified in response to the sensed error by being incremented or decremented by an amount selected by the designer and controlled by the algorithm and at a periodic rate selected by the designer and controlled by the algorithm. In this manner the algorithm increments and decrements the variable filter in a way that drives the error to as near zero as practical and continues to increment and decrement the variable filter as becomes necessary in view of subsequent error signals to maintain the error as near zero as is practical. Adaptive filter algorithms, such as the LMS algorithm, are standard algorithms described in the literature that operate to drive an error signal to zero.

The Adaptive Balancing Signal Generators of the Invention

Figure 2:
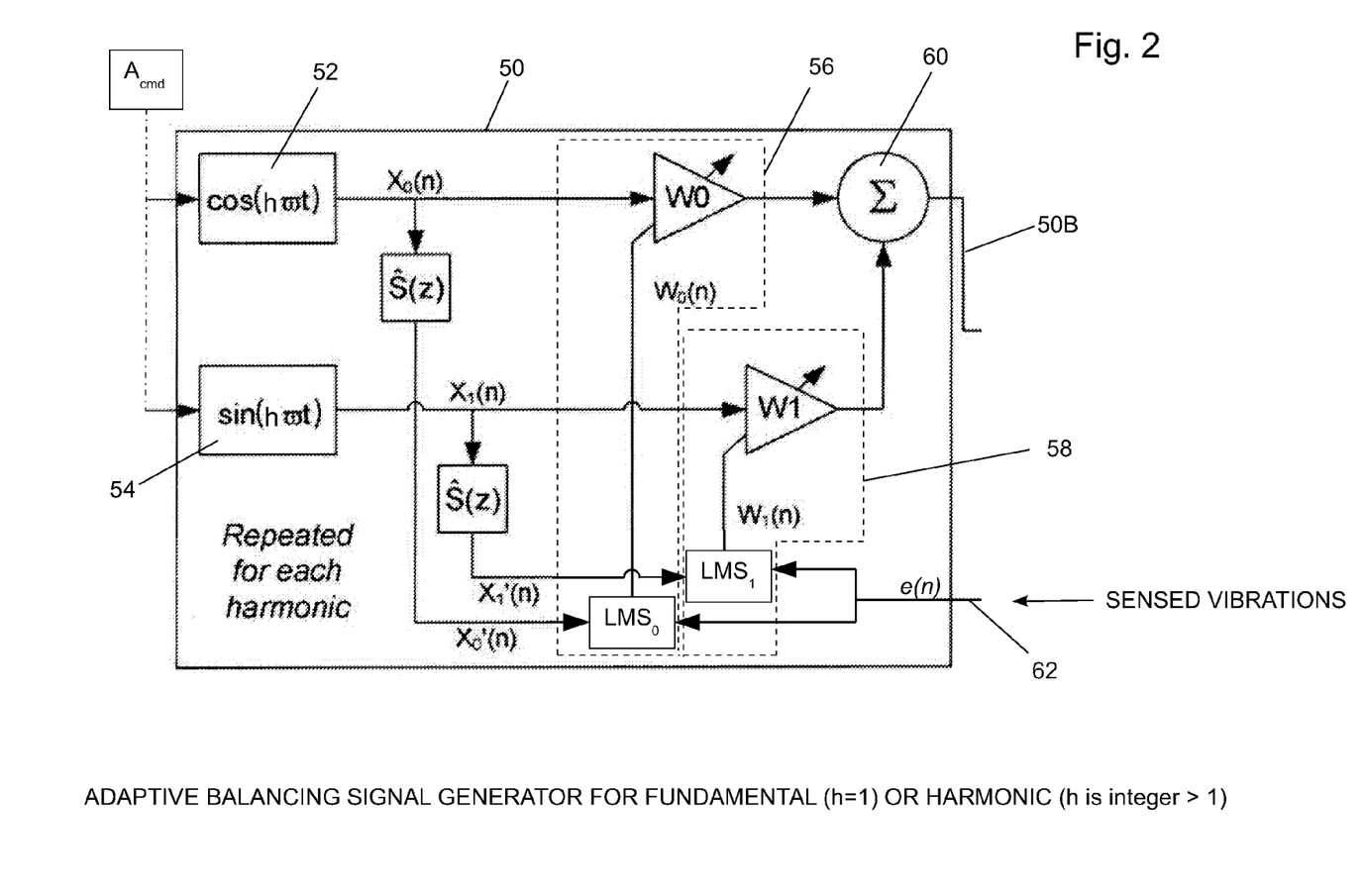
FIG. 2 is a block diagram illustrating the operation of the adaptive balancing signal generators that are components of the invention.
Figure 3:
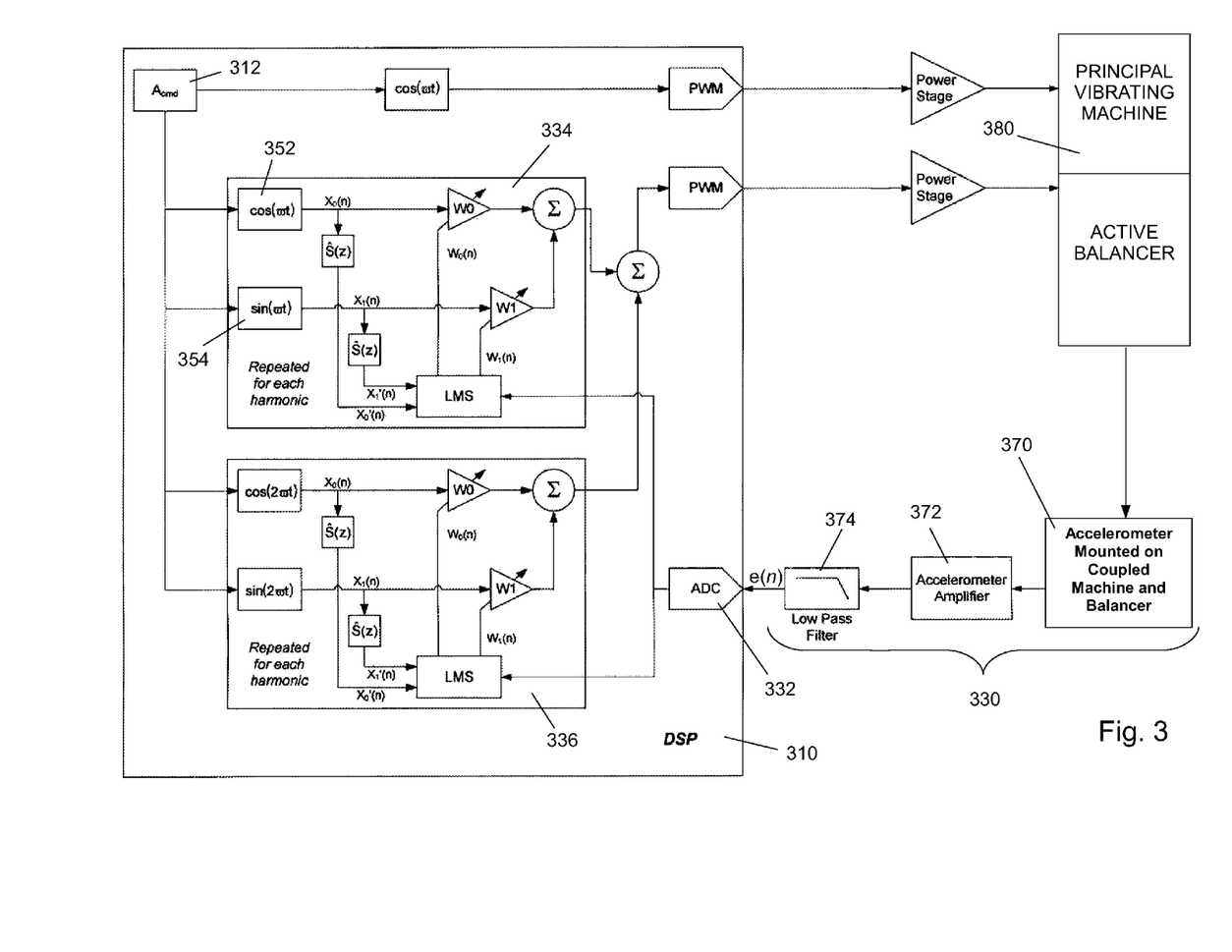
FIG. 3 is a diagram illustrating an embodiment of the invention.
Figure 4:
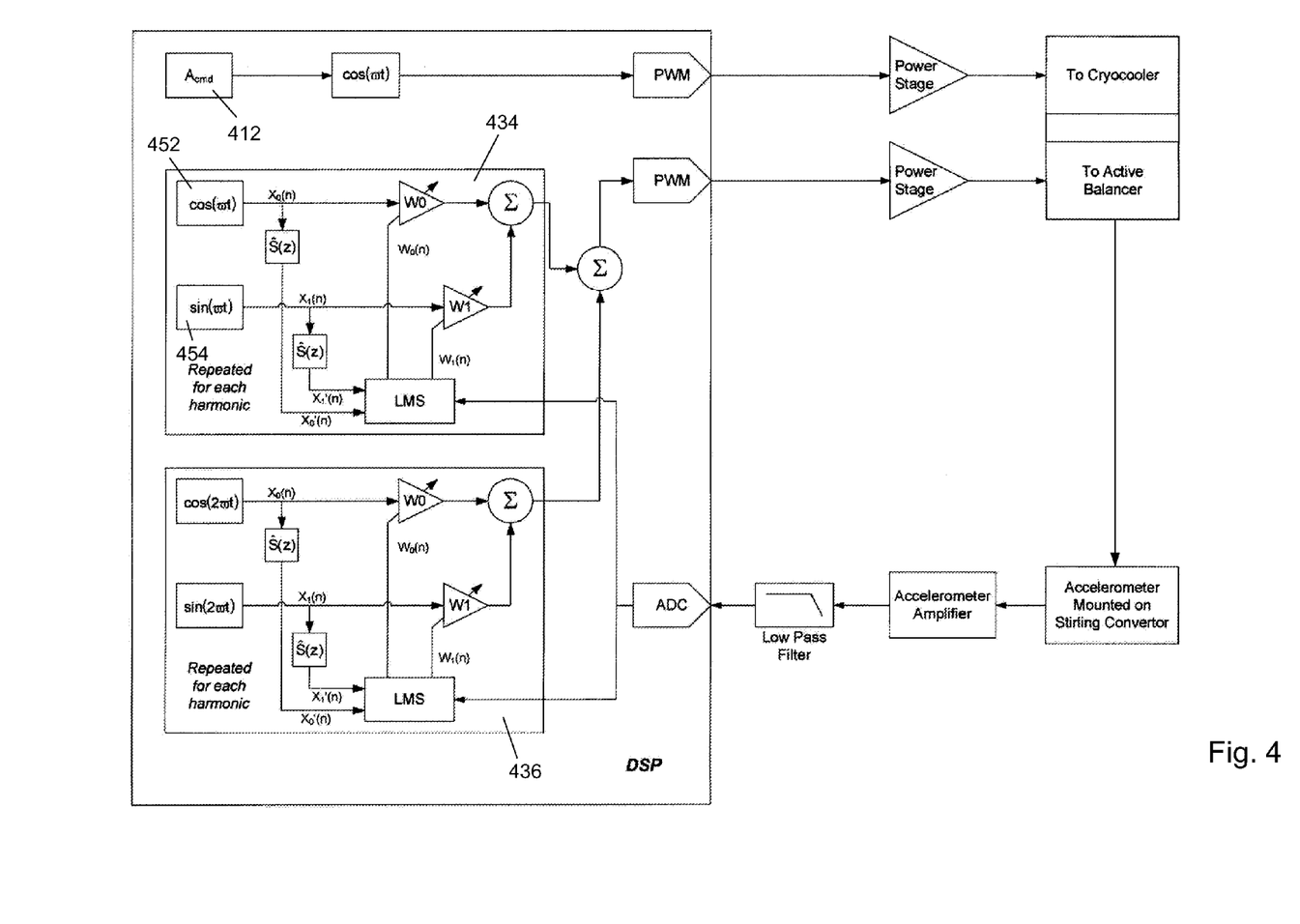
FIG. 4 is a diagram illustrating another embodiment of the invention.
Figure 5:
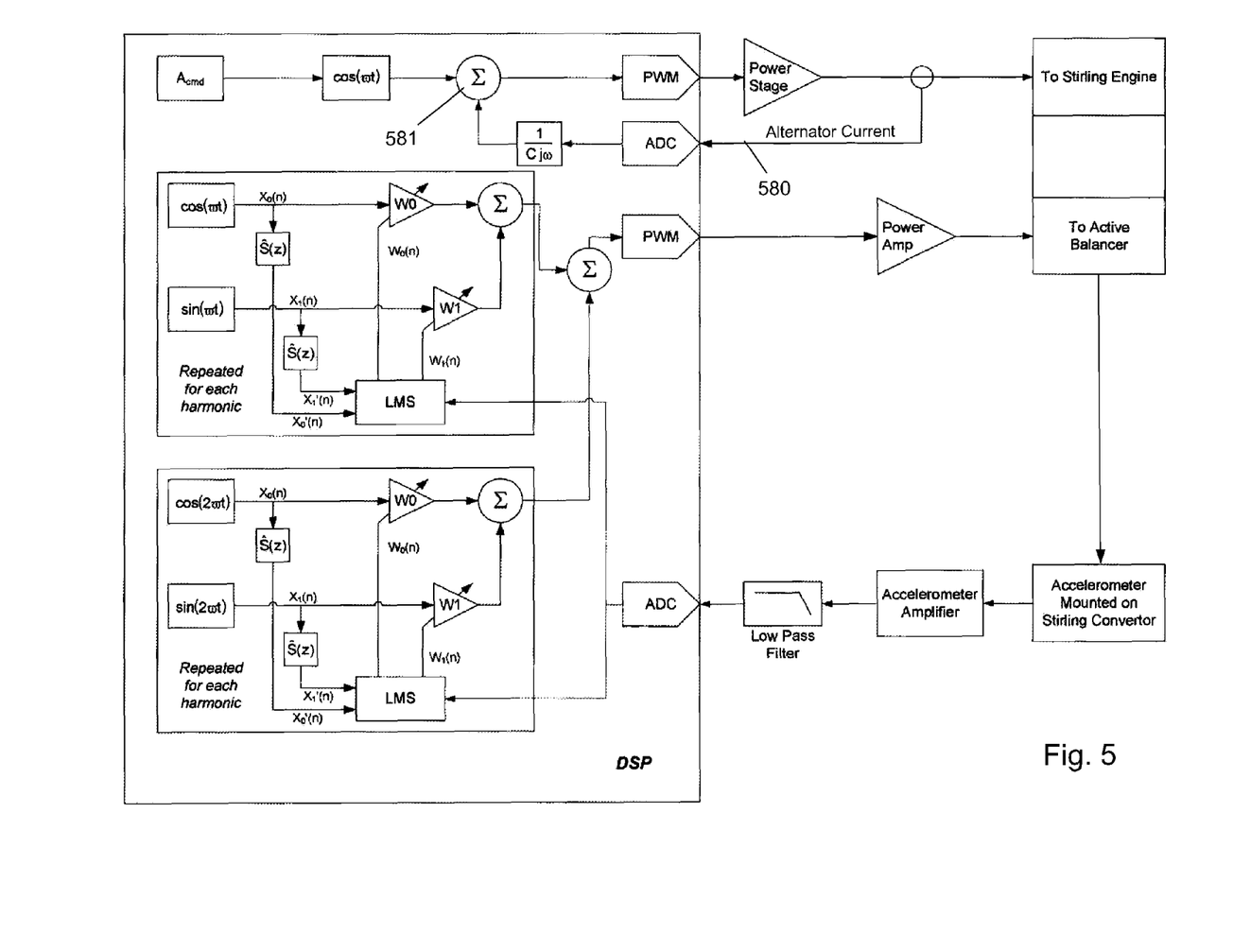
FIG. 5 is a diagram illustrating yet another embodiment of the invention.

For each frequency which is sought to be balanced, there is an adaptive, balancing signal generator which is assigned to that particular frequency. The purpose of each adaptive balancing signal generator is to derive and maintain, from the sensed vibration input, a signal that generates forces in the drive motor of the active balancer that oppose and cancel the vibration at its assigned frequency. FIG. 2 illustrates the adaptive balancing signal generators 34, 36 or 38 that are shown as blocks in FIG. 1. These adaptive balancing signal generators are identical except that each is adapted to operate at the different frequency which is assigned to it. Each adaptive, balancing signal generator 50 (FIG. 2) includes quadrature, sinusoidally varying, reference signal generators 52 and 54. The reference generator 52 generates cos(hωt) where h is 1 (the fundamental) or the $h^{th}$ harmonic that is assigned to the balancing signal generator and ω is the fundamental operating frequency of the coupled pair. The reference generator 54 generates sin(hωt). As can be visualized from phasors representing the quadrature cos and sin functions, quadrature sinusoidal signals are components that can be summed to a resultant. The resultant can be at any phase and any amplitude merely by varying the amplitude of these two quadrature components. As can be seen in FIG. 3, the amplitude of the reference generators can be controlled by controlling their amplitudes as a function of $A_{cmd}$ so that their amplitudes are proportional to $A_{cmd}$. Alternatively, as seen in FIGS. 4 and 5, the reference generators can have a constant unit amplitude. The purpose of the sinusoidal reference signal generators 52 and 54 is to generate, at its assigned frequency, a pair of quadrature, sinusoidally varying, cos and sin reference signals The adaptive, balancing signal generator 50 also has two adaptive filters 56 and 58. The adaptive filter 56 has a variable filter W0 that is controllably varied by its adaptive LMS algorithm $LMS_0$. The adaptive filter 58 has a variable filter W1 that is variably controlled by its adaptive LMS algorithm $LMS_1$.

The sensed vibration signal is applied as an input to the adaptive filter algorithm that controls each of the pair of variable filters. More specifically, the sensed vibration signal e(n) is applied to the adaptive filter algorithms $LMS_0$ and $LMS_1$. The outputs of the reference generators 52 and 54 are also applied to each of a pair of variable filters of a pair of adaptive filters that are controlled by an adaptive filter algorithm. More specifically, the signal from reference generator 52, which generates cos(hωt), is applied to variable filter W0 and the signal from reference generator 54, which generates sin(hωt), is applied to variable filter W1. Therefore, the output signals from variable filters W0 and W1 are quadrature sinusoidal signals each having an amplitude determined by the respective gains of variable filters W0 and W1. The respective gains for the variable filters W0 and W1 are determined by their respective adaptive algorithms $LMS_0$ and $LMS_1$ and are periodically updated. The quadrature sinusoidal signals from W0 and W1 are phasor components that can be summed (vector/phasor sums) at a summing junction 60 to provide a resultant output from the summing junction 60 that is at the harmonic frequency that is assigned to the balancing signal generator 50 and has a phase and amplitude that is determined by the $LMS_0$ and $LMS_1$ adaptive filter algorithms. These adaptive filter algorithms generate a balancing signal for the assigned frequency. That balancing signal has an amplitude and phase so that, when fed forward to the armature winding of the drive motor of the active balancer, it will generate motor forces that oppose and essentially cancel the vibrations at the assigned frequency of the adaptive, balancing signal generator 50.

The design parameters for the adaptive filters are relatively simple. The algorithm itself is readily available in the prior art. The algorithm that controls each variable filter updates the variable filter in incremental steps. The two parameters chosen by the designer are (1) the update rate (how often it updates) and (2) the amount of the update (how much change in the gain of the variable filter is made at each update). The update rate is how often the LMS algorithm is processed. The update rate is chosen as some multiple of the frequency that is assigned to the balancing signal generator. Typically an update should occur 5 to 10 times during a period of the assigned frequency. The amount of change in the gain of the variable filters for each incremental update is best determined experimentally by a repetitive trial and error method. Several update amounts over a range are individually tried and the stability, effectiveness in reducing the vibrations and speed of response are then observed. The chosen amount of change at each update is ordinarily a function of the fed back error, with less change for a smaller error and typically is proportional to the error amplitude. The LMS or other control algorithm determines the direction of change based upon the sign of the error.

The signal from each sinusoidally varying, cos and sin reference generator 52 and 54 is also multiplied by a transfer function $\hat{S}(z)$ and the product is applied as an input to the adaptive filter algorithms $LMS_0$ and $LMS_1$ of the adaptive filters 56 and 58. The transfer function $\hat{S}(z)$ is the transfer function from the output 50B of the balancing signal generator 50 to the sensed vibration input 62. The transfer function is a complex mathematical expression for the entire system that is external to the balancing signal generator 50. As well known, a transfer function is the ratio of output divided by input and in this case is the sensed vibration signal input at the input 62 divided by the output at output 50B of the balancing signal generator 50.

The transfer function provides an estimate or predicted response for use by the adaptive filter algorithms $LMS_0$ and $LMS_1$. The transfer function creates a model, in the sense of providing a transfer function that represents the system. The transfer function accounts for the fact that the response of the external system includes a balancer component. It estimates the behavior of the system with the balancer which is also generating a counter force opposing the vibrations at the fundamental operating frequency. The transfer function provides an estimation of the vibration that would be generated if a certain vibration canceling signal were applied by the balancing signal generator 50. Of course it is expected that the system will change greatly during operation. But the LMS algorithms use that transfer function signal to decide the direction (increase or decrease) to vary the gain of the variable filters W0 and W1 to try to reduce vibration to zero.

The transfer function $\hat{S}(z)$ can be determined in the conventional manner by determining the transfer function for each component along the path from the input to the output that it represents and multiplying them together to get the resulting total transfer function from input to output. Alternatively, however, because that is a complicated and difficult mathematical exercise, instead of developing a mathematical expression of the transfer function in that manner, it is possible, and preferred, to obtain it by laboratory measurement. For each $\hat{S}(z)$ for each frequency, with each output 50B and input 62 (of each adaptive balancing signal generator) disconnected from the circuit and the system not operating, an input unit sinusoid is applied to the summing junction 40. The returned error signal that is output by the vibration sensor 30 (FIG. 1) is observed and its amplitude and phase are measured. The measured returned output signal divided by the measured injected input signal is the transfer function. Both the input and the output are simply an amplitude A, phase θ and frequency for each assigned frequency. Consequently the output of the functional block is the expected output from the system that is external to the balancing signal generator at its assigned frequency and represents the expected error e(n). The transfer function represents a harmonic balancing signal for the assigned frequency divided by the sensed vibration signal corresponding to the vibration at the selected frequency.

As stated above, the harmonic balancing signal for the selected frequency that is assigned to a balancing signal generator is obtained by summing (phasor/vector sum) the quadrature outputs of the variable filters W0 and W1. That summing operation is represented by summing junction 60. Referring back to FIG. 1, a composite balancing signal for all the frequencies is generated by summing the balancing signals for all of the frequencies and applying that sum to the drive motor 24. That is illustrated (in FIG. 1) by applying the outputs 34B, 36B and 38B to the summing junction 40 and applying that sum to the digital to analog converter 26.

FIG. 3 illustrates an embodiment of the invention. The adaptive balancing signal generators 334 and 336 are identical to those illustrated in FIGS. 1 and 2. However, in the embodiment of FIG. 3 the command input $A_{cmd}$ is applied to all the reference generators, such as cos reference generator 352 and sin reference generator 354. That causes the amplitude of the reference signals to be varied in proportion to $A_{cmd}$. Varying the amplitude of the reference generators as a function of $A_{cmd}$ provides the additional advantage of amplitude feed forward control.

FIG. 3, as well as FIGS. 4 and 5, also illustrates a vibration sensor 330 in more detail. The vibrations are preferably sensed by an accelerometer 370 that applies its output to an amplifier 372. The amplified output is filtered by a low pass filter 374. The cutoff frequency for the low pass filter 374 is above the frequency of the highest selected harmonic for which the designer wants to minimize the vibrations using the techniques of the present invention. Its purpose is to filter out noise at frequencies above the highest selected harmonic frequency.

The sensed vibration signal e(n) that is applied from the low pass filter 374 to the digital processor 310, through its analog to digital converter 332, is a composite analog signal that is the sum of the vibrations at the fundamental operating frequency and all of its harmonics below the filter cutoff frequency. That composite signal, in digital format, is applied to each of the adaptive balancing signal generators and therefore includes all of the Fourier components of the composite vibration signal. However, it is an inherent characteristic of the adaptive filter algorithm that it only responds to the Fourier component that is at the frequency of its reference generators 52 and 54 (FIG. 2). Each of the balancing signal generators has reference generators at its assigned frequency so each balancing signal generator only responds to the component of e(n) that is at its assigned frequency. Consequently, there is no need for any further filtering of the composite vibrations signal e(n) in order to extract the Fourier component for each assigned frequency. The control system that may be used to control the principal vibrating machine 380 and is prior art to the present invention is shown and described in my U.S. Pat. No. 7,511,459

FIG. 4 illustrates another embodiment of the invention and its adaptive balancing signal generators 434 and 436 are also identical to those illustrated in FIGS. 1 and 2. The embodiment of FIG. 4 is like the embodiment of FIG. 3 except that, in the embodiment of FIG. 4 the command input $A_{cmd}$ (412) is not applied to any of the reference signal generators, such as cos reference generator 452 and sin reference generator 454. Consequently, the amplitude of their generated reference signals always has a unit value so there is no amplitude feed forward that is proportional to $A_{cmd}$. FIG. 4 is also shown with a principal vibrating machine that is a cryocooler which may be driven by a linear motor.

FIG. 5 is an embodiment of the invention like the embodiment of FIG. 4 except that it shows the invention integrated with a different prior art principal vibrating machine that is a Stirling engine, for example driving an alternator, and has a feedback leg 580 providing a feed forward control signal that is summed with the principal control signal at a summing junction 581.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for balancing the vibration of a principal vibrating machine that operates at a fundamental operating frequency, the principal vibrating machine being mechanically coupled to an active vibration balancer that is driven by a drive motor, the method minimizing vibration of the coupled principal machine and balancer at the fundamental operating frequency and at any harmonic of the fundamental operating frequency and comprising:
    (a) sensing the vibration of the coupled principal machine and balancer to provide a sensed vibration signal representing the sensed vibration;
    (b) generating a balancing signal for the fundamental operating frequency and for at least a selected harmonic of the fundamental operating frequency by processing the sensed vibration signal with an adaptive filter algorithm of an adaptive filter for the fundamental operating frequency and for each selected harmonic frequency, the adaptive filter algorithm having a reference input at the fundamental operating frequency and at each selected harmonic frequency; and
    (c) summing the generated balancing signals and applying the summed signal to the active vibration balancer drive motor and thereby driving the drive motor with a drive voltage component for the fundamental operating frequency and for each selected harmonic frequency in opposition to the vibration at the fundamental operating frequency and at each selected harmonic frequency.

2. A method in accordance with claim 1 wherein the step of generating a harmonic balancing signal further comprises, for the fundamental operating frequency and for each selected harmonic frequency:
    (i) generating, at the fundamental operating frequency and at each selected harmonic frequency, a pair of quadrature, sinusoidally varying, cos and sin reference signals and applying those signals to each of a pair of variable filters of a pair of adaptive filters that are controlled by an adaptive filter algorithm;
    (ii) inputting the sensed vibration signal to an adaptive filter algorithm that controls each of the pair of variable filters;
    (iii) multiplying each sinusoidally varying, cos and sin reference signal by a transfer function representing a balancing signal for each selected frequency divided by the sensed vibration signal corresponding to the vibration at the selected frequency and inputting the multiplied reference signals to the adaptive filter algorithm for each adaptive filter; and (iv) summing the outputs of the variable filters to provide the balancing signal for the selected frequency.

3. A method in accordance with claim 2 wherein the method is performed for a plurality of selected harmonics.

4. A method in accordance with claim 3 wherein the amplitude of each pair of quadrature, sinusoidally varying, cos and sin reference signals is controllably varied in proportion to a command input to a control for the principal vibrating machine.

5. A method in accordance with claim 4 wherein each variable filter is an amplitude multiplier with a gain controlled by its adaptive filter algorithm.

6. A method in accordance with claim 5 wherein the adaptive filter algorithm is a Least Mean Squares algorithm.

7. A method in accordance with claim 6 wherein each adaptive filter algorithm has a periodic update rate at which it varies its variable filter in the range of 5 to 10 times the frequency for which it is generating a balancing signal.

\* \* \* \* \*